United States Patent [19]
Kondo

[11] Patent Number: 5,621,465
[45] Date of Patent: Apr. 15, 1997

[54] COLOR IMAGE ENCODER

[75] Inventor: Satoshi Kondo, Kyoto-fu, Japan

[73] Assignee: Matsushita Electric Industrial Co., Ltd., Osaka, Japan

[21] Appl. No.: 630,777

[22] Filed: Apr. 10, 1996

[30] Foreign Application Priority Data

Apr. 11, 1995 [JP] Japan .................................. 7-085288

[51] Int. Cl.⁶ .................................................. H04N 7/26
[52] U.S. Cl. .......................................... 348/395; 348/405
[58] Field of Search .................................. 348/384, 390,
348/391, 393, 395, 396, 405, 419, 420;
382/251; 395/131

[56] References Cited

U.S. PATENT DOCUMENTS

| | | | |
|---|---|---|---|
| 5,233,684 | 8/1993 | Ulichney | 345/131 |
| 5,301,242 | 4/1994 | Gonzales | 348/384 |
| 5,323,187 | 6/1994 | Park | 348/405 |
| 5,369,439 | 11/1994 | Matsuda et al. . | |
| 5,544,284 | 8/1996 | Allebach et al. | 395/131 |

FOREIGN PATENT DOCUMENTS 6-225340   8/1994   Japan .

*Primary Examiner*—Amelia Au
*Attorney, Agent, or Firm*—Wenderoth, Lind & Ponack

[57] ABSTRACT

A color image encoder comprises a block converter for dividing a digital color video signal, which is composed of a Y signal and R-Y and B-Y signals, into blocks for the respective signals; an orthogonal transformer for orthogonally transforming the digital image video signal divided into the blocks, for each block, to produce orthogonal transform coefficients; a quantizer for quantizing the orthogonal transform coefficients; a variable length encoder for coding the quantized orthogonal transform coefficients to produce a code sequence; a generator code length counter for counting the length of the code sequence; a chrominance signal inspection circuit for calculating an absolute value of a difference between an average of pixel values in each block of at least one of the two chrominance signals and a value in an achromatic level of the chrominance signal, detecting a maximum value from the absolute values obtained in a unit of a collection of pixels for which a quantization scale used in the quantizer is to be changed, and comparing the maximum value with a prescribed threshold value; and a quantization scale decision circuit for providing a real quantization scale used in the quantizer on the basis of the length of the code sequence counted by the generator code length counter when the chrominance signal inspection circuit judges that the maximum value is smaller than the threshold value, and providing a real quantization scale used in the quantizer so that it becomes smaller than the interim quantization scale which is obtained on the basis of the length of the code sequence counted by the generator code length counter when the chrominance signal inspection circuit judges that the maximum value is larger than the threshold value. Therefore, a block for which the quantization scale is to be made small can be selected by a simple threshold setting for the chrominance signal, whereby visually conspicuous deterioration of image quality can be reduced.

7 Claims, 13 Drawing Sheets

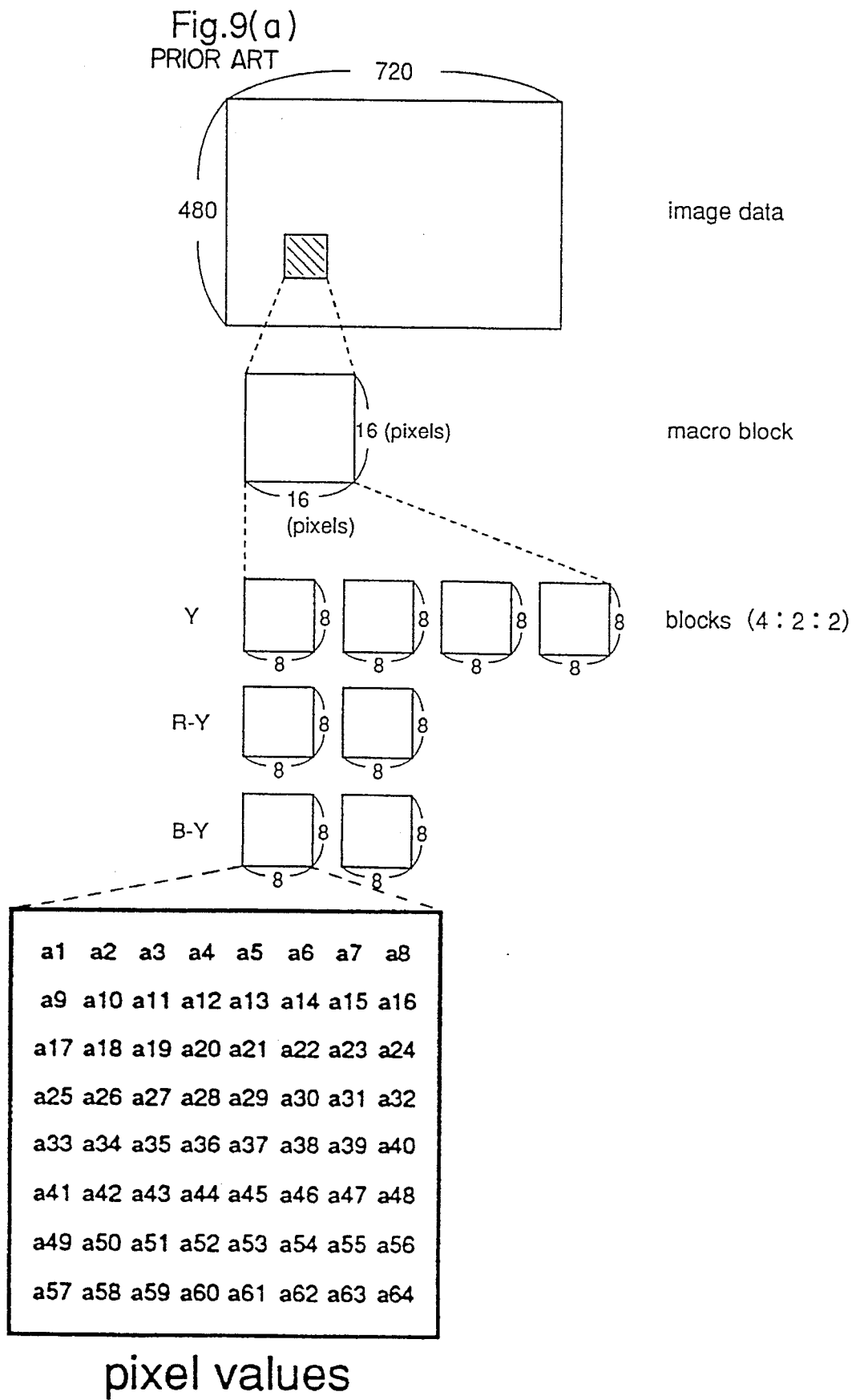

Fig.10 (a) PRIOR ART
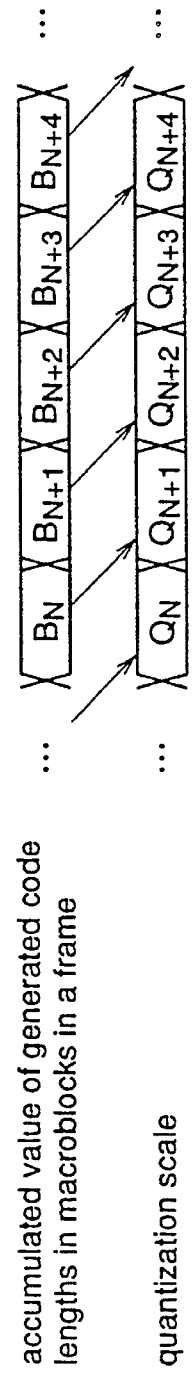
macro block number
accumulated value of generated code lengths in macroblocks in a frame
quantization scale
Fig.10 (b) PRIOR ART
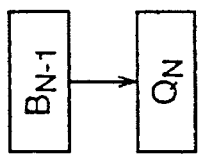

T : threshold value

COLOR IMAGE ENCODER

FIELD OF THE INVENTION

The present invention relates to a color image encoder that can reduce visually conspicuous deterioration in color image quality.

BACKGROUND OF THE INVENTION

In recent years, an image coding method utilizing orthogonal transform, such as discrete cosine transform (DCT), and variable length coding, such as Huffman coding, is well known. The MPEG (Moving Picture Experts Group) system is typical of the image coding method.

An example of a conventional image encoder utilizing orthogonal transform and variable length coding is illustrated in FIG. 8. Hereinafter, a coding method according to the MPEG system will he described with reference to FIG. 8.

In FIG. 8, reference numeral 11 designates a block converter for dividing a digital video signal 18 into blocks for a Y signal, an R-Y signal, and a B-Y signal. Each block has a size of 8×8 pixels. Reference numeral 12 designates an orthogonal transformer for orthogonally transforming a digital video signal 20 divided into the blocks, for each block, to produce orthogonal transform coefficients 128. Reference numeral 13 designates a quantizer for quantizing the orthogonal transform coefficients 128. The quantization is performed by dividing the orthogonal transform coefficients 128 using 8×8 quantization matrices (not shown) corresponding to the respective frequencies after the orthogonal transformation and a quantization scale 168 decided by a quantization scale decision circuit 16. Reference numeral 14 designates a variable length encoder that performs variable length coding for the quantized orthogonal transform coefficients 138 with a macroblock MB as a unit and produces a code sequence 19. Reference numeral 17 designates a generated code length counter that receives a code length signal 148 output from the variable length encoder 14, accumulatively counts the code length, and detects a generated code length. Reference numeral 16 designates a quantization scale decision circuit for deciding a quantization scale 168 for the quantization of the orthogonal transform coefficients 138 in the quantizer 13, on the basis of an output 178 from the generator code length counter 17.

A description is given of the operation of the conventional color image encoder with reference to FIGS. 2, 8, 9, and 10.

As illustrated in FIG. 9, the digital video signal 18 is divided into a plurality of macroblocks, each having a size of 16×16 pixels, by the block converter 11 and, thereafter, each macroblock is converted to blocks for the Y signal, the R-Y signal, and the B-Y signal, each block having a size of 8×8 pixels. FIG. 2 shows components of the video signal which is converted to blocks by the block converter 11. In FIG. 2, Y1, Cr1, and Cb1 denote blocks of the Y, R-Y, and B-Y signals, respectively, included in a range of 16×16 pixels of the Y signal. The blocks Y1, Cr1, and Cb1 comprise, with 8×8 pixels as a unit block, 4 blocks (=2×2), 2 blocks (=2×1), and 2 blocks (=2×1), respectively. A macroblock MB is composed of these blocks Y1, Cr1, and Cb1.

Turning to FIG. 8, the digital video signal 20 converted to the blocks is subjected to orthogonal transform for each block by the orthogonal transformer 12, resulting in orthogonal transform coefficients 128 (refer to FIG. 9). The orthogonal transform coefficients 128 are quantized by the quantizer 13 (refer to FIG. 9). This quantization is performed by dividing the orthogonal transform coefficients 128 with values obtained by multiplying 8×8 quantization matrices (not shown) corresponding to the respective frequencies after the orthogonal transformation by a quantization scale 168 decided by the quantization scale decision circuit 16. Different quantization matrices are used for the luminance signal (Y signal) and the chrominance signals (R-Y and R-B signals) whereas the same quantization scale 168 is used for all the blocks in the macroblock. The quantized orthogonal transform coefficients 138 are subjected to variable length coding by the variable length encoder 14, resulting in a code sequence 19. The generator code length counter 17 counts the code length 148 generated in the variable length encoder 14. In case of MPEG, the code length is counted for each macroblock in one frame, and an accumulated code length in the frame (in FIG. 10(a), $B_N$ for the macroblock number N) is obtained. Receiving the accumulated code length 178 from the generator code length counter 17, the quantization scale decision circuit 16 decides a quantization scale 168 (in FIG. 10(a), $Q_{N+1}$ for $B_N$) so that the generated code length takes a prescribed value. As a unit for which the generated code length is made constant, one frame or one frame to several frames is selected.

In the conventional color image encoder as shown in FIG. 8, a quantization scale of a block to be encoded is decided on the basis of a code length which have been obtained previously. Therefore, the quantization is performed regardless of man's visual properties. Although man's visual sensation is sensitive to red color, since the same quantization distortion occurs for every color in the conventional device, deterioration due to the quantization distortion is more conspicuous in a red part than in parts of other colors.

In order to solve this problem, Japanese Published Patent Application No. Hei. 6-225340 proposed a method of prohibiting or reducing an increase in the quantization scale when a color in or near its saturation state is included. That is, when a color in or near its saturation state is included, even a little deterioration is conspicuous. So, the quantization scale is made small, whereby the deterioration is prevented. In this method, however, it is impossible to prevent deteriorations of cyan and yellow which are in opposite phases to red and blue.

Further, this publication proposed a method of making the quantization scale small when a saturation level is detected for a specified color, for example, violet. In this method, however, in order to judge if the specified color has reached the saturation level, various threshold values for the R-Y and B-Y signals must be set to detect the specified color, so that the setting of the threshold values is significantly complicated.

SUMMARY OF THE INVENTION

An object of the present invention is to provide a color image encoder utilizing orthogonal transform and variable length coding, that can reduce visually conspicuous deterioration of image quality by selecting a block for which a quantization scale is to be made small, by a simple setting of a threshold, and reducing the quantization scale of the selected block.

Other objects and advantages of the invention will become apparent from the detailed description that follows. The detailed description and specific embodiments described are provided only for illustration since various additions and modifications within the spirit and scope of the invention will be apparent to those of skill in the art from the detailed description.

According to a first aspect of the present invention, a color image encoder for coding a digital color video signal comprising a Y signal (luminance signal) and R-Y and B-Y signals (chrominance signals), comprises a block converter for dividing the digital color video signal into blocks for the respective signals; an orthogonal transformer for orthogonally transforming the digital image video signal divided into the blocks, for each block, to produce orthogonal transform coefficients; a quantizer for quantizing the orthogonal transform coefficients; a variable length encoder for coding the quantized orthogonal transform coefficients to produce a code sequence; a generator code length counter for accumulatively counting the length of the code sequence which is coded by the quantizer, in a collection of blocks for which the generated code length counted by the variable length encoder is to be made constant; a chrominance signal inspection circuit for calculating an absolute value of a difference between an average of pixel values in each block of at least one of the two chrominance signals and a value in an achromatic level of the chrominance signal, detecting a maximum value from the absolute values in a unit of a collection of pixels, for which a quantization scale used in the quantizer is to be changed, and comparing the maximum value with a prescribed threshold value; and a quantization scale decision circuit for providing a real quantization scale used in the quantizer on the basis of the length of the code sequence counted by the generator code length counter when the chrominance signal inspection circuit judges that the maximum value is smaller than the threshold value, and providing a real quantization scale used in the quantizer so that it becomes smaller than the interim quantization scale which is obtained on the basis of the length of the code sequence counted by the generator code length counter when the chrominance signal inspection circuit judges that the maximum value is larger than the threshold value. Therefore, a block for which the quantization scale is to be made small can be selected by a simple threshold setting for the chrominance signal, whereby visually conspicuous deterioration of image quality can be reduced.

According to a second aspect of the present invention, in the above-described color image encoder, the threshold value used in the chrominance signal inspection circuit is a constant value. Therefore, a block for which the quantization scale is to be made small can be selected by a simple threshold setting for the chrominance signal, whereby visually conspicuous deterioration of image quality can be reduced.

According to a third aspect of the present invention, in the above-described color image encoder, the threshold value used in the chrominance signal inspection circuit is a variable value. Therefore, the threshold value can be varied adaptively to the input digital video signal, so that the visually conspicuous deterioration of image quality can be reduced adaptively to the characteristics of the video signal.

According to a fourth aspect of the present invention, in the above-described color image encoder, the threshold value used in the chrominance signal inspection circuit is an average of the maximum values of the absolute values obtained for the frame for which coding has just been performed. Therefore, the visually conspicuous deterioration of image quality can be reduced adaptively to the characteristics of the image of the previous frame.

According to a fifth aspect of the present invention, in the above-described color image encoder, the real quantization scale is set to ½~⅓ of the interim quantization scale. Therefore, the visually conspicuous deterioration of image quality can be reduced effectively.

According to a sixth aspect of the present invention, in the above-described color image encoder, the real quantization scale is set against the interim quantization scale using the following formula:

$$Qr=Qi/\{2+(X-T)/(112-T)\} \quad (X>T)$$

wherein Qr is the real quantization scale, Qi is the interim quantization scale, X is the maximum value of the absolute value of the difference, and T is the threshold value. Therefore, the visually conspicuous deterioration of image quality can be reduced effectively.

According to a seventh aspect of the present invention, in the above-described color image encoder, a DC component of the chrominance signal block obtained by the orthogonal transformer is used as an average of pixel values of the chrominance signal block. Therefore, an average value calculator included in the above-described chrominance signal inspection circuit is dispensed with, whereby the circuit structure is simplified.

BRIEF DESCRIPTION OF THE DRAWINGS

FIGS. 10(a) and 10(b) are diagrams for explaining the operation of the conventional color image encoder, wherein FIG. 10(a) illustrates an accumulated value of generated code lengths of macroblocks in a frame and a quantization scale for each macroblock, and FIG. 10(b) shows a process of deciding the quantization scale from the accumulated value.

FIGS. 11(a) and 11(b) are diagrams for explaining the operation of the color image encoder according to the first embodiment of the invention, wherein FIG. 11(a) illustrates an accumulated value of generated code lengths of macroblocks in a frame, an interim quantization scale for each macroblock, an output from a maximum value detector, an output from a comparator, and a real quantization scale, and FIG. 11(b) illustrates a process of deciding the real quantization scale from the accumulated value.

DETAILED DESCRIPTION OF THE PREFERRED EMBODIMENTS

[Embodiment 1]

A color image encoder in accordance with a first embodiment of the present invention will be described with reference to FIG. 1. In this first embodiment, an input digital video signal has a 4:2:2 format, and a quantization scale is changed with a macroblock comprising a plurality of blocks as a unit, as in the MPEG system.

Figure 1:
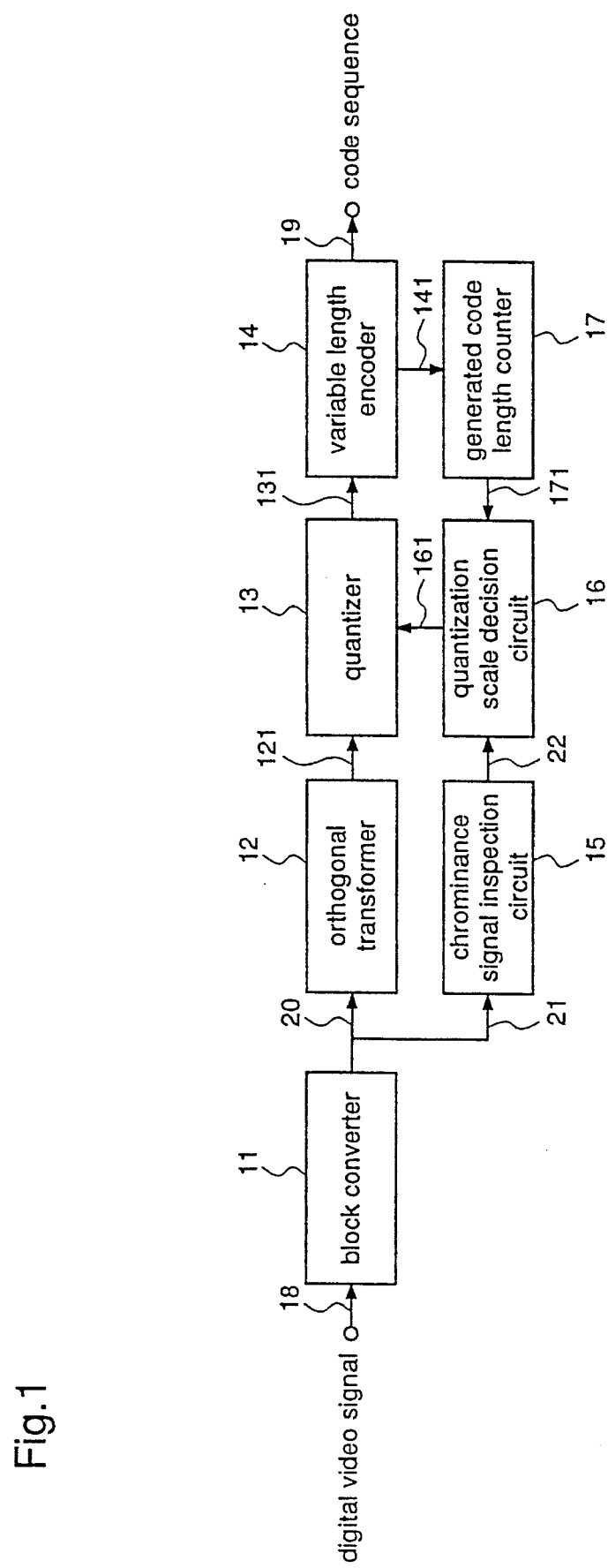
FIG. 1 is a block diagram illustrating a color image encoder in accordance with a first embodiment of the present invention.

In FIG. 1, reference numeral 11 designates a block converter for transforming a digital video signal 18 into blocks for Y, R-Y, and B-Y signals, each block having a size of 8×8 pixels. Reference numeral 12 designates an orthogonal transformer for orthogonally transforming a digital video signal 20 divided into the blocks, for each block, to produce orthogonal transform coefficients 121. Reference numeral 13 designates a quantizer for quantizing the orthogonal transform coefficients 121. The quantization is performed by dividing the orthogonal transform coefficients 121 using 8×8 quantization matrices (not shown) corresponding to the respective frequencies after the orthogonal transformation and a quantization scale 161 decided by a quantization scale decision circuit 16. Reference numeral 14 designates a variable length encoder that performs variable length coding for the quantized orthogonal transform coefficients 131 with a macroblock as a unit and produces a code sequence 19. Reference numeral 17 designates a generator code length counter that receives a code length signal 141 output from the variable length encoder 14, accumulatively counts the code length, and detects a generated code length.

Reference numeral 15 designates a chrominance signal inspection circuit for inspecting a chrominance signal from an output 21 of the block converter 11. More specifically, the chrominance signal inspection circuit 11 calculates an absolute value of a difference between an average of pixel values in each block of at least one of two chrominance signals and an achromatic level value of the chrominance signal, and compares a maximum value of the absolute value within a pixel unit, i.e., a macroblock, for which a quantization scale used in the quantizer is to be changed, with a prescribed threshold value. Reference numeral 16 designates a quantization scale decision circuit for deciding a quantization scale 161 used for the quantization of the orthogonal transform coefficients 121 in the quantizer 13, on the basis of an output 22 from the chrominance signal inspection circuit 15 and an output 171 from the generator code length counter 17. More specifically, when the chrominance signal inspection circuit 15 judges that the maximum value is smaller than the threshold value, the quantization scale decision circuit 16 decides a quantization scale 161 on the basis of a code sequence length 171 counted by the generator code length counter 17. When the chrominance signal inspection circuit 15 judges that the maximum value is larger than the threshold value, the quantization scale decision circuit 16 provides a quantization scale 161 smaller than the quantization scale that is obtained on the basis of the code sequence length 171 counted by the generator code length counter 17. The quantization scale 161 so decided is applied to the quantizer 13.

A description is given of the operation of the color image encoder.

Figure 2:
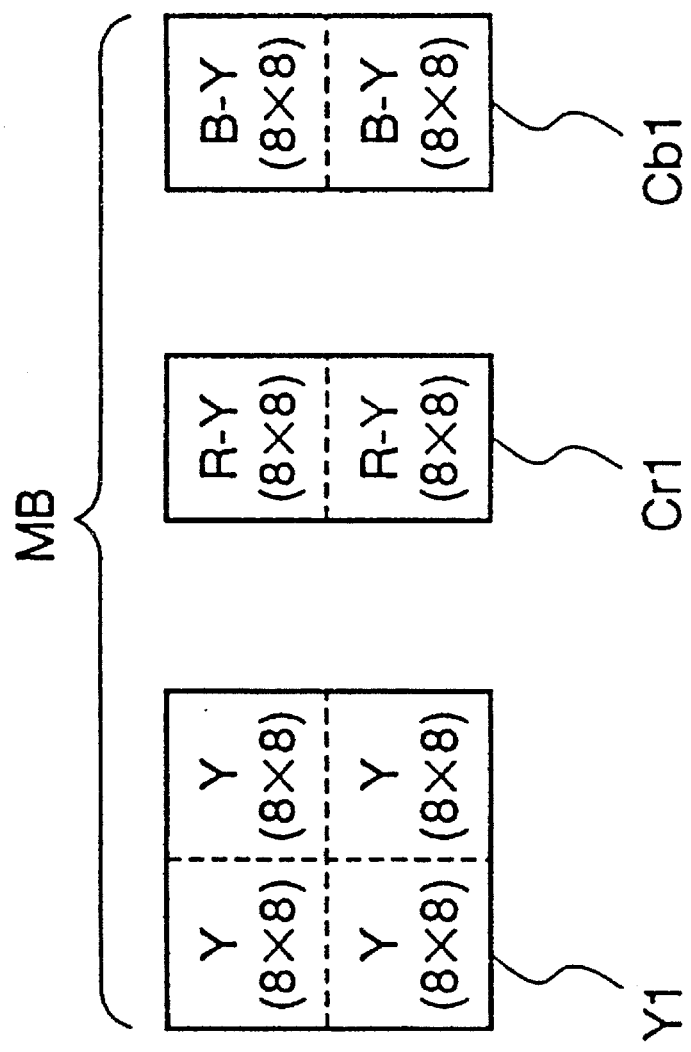
FIG. 2 is a diagram illustrating schematic patterns for a luminance signal block and chrominance signal blocks in case where a digital video signal has a format of 4:2:2, according to the first embodiment of the present invention.
Figure 9B:
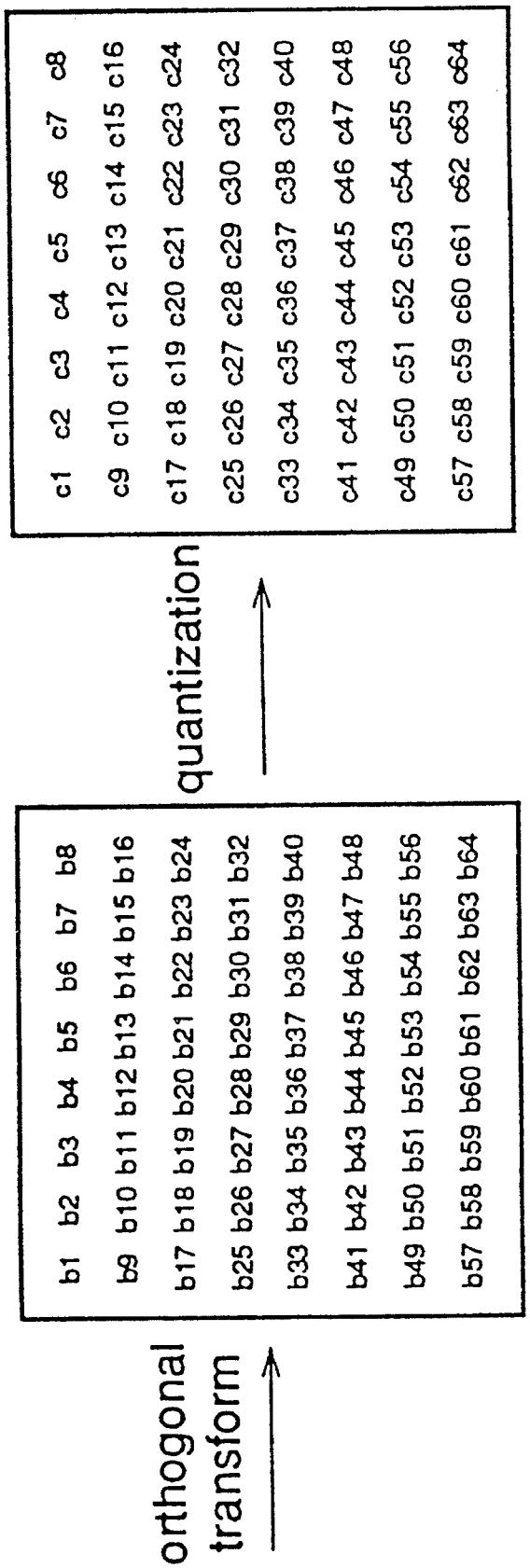
FIG. 9 is a diagram for explaining the operation of the color image encoder according to the first embodiment of the invention or the conventional color image encoder.

As already described with respect to FIG. 9, the digital video signal 18 is divided into a plurality of macroblocks, each having a size of 16×16 pixels, by the block converter 11 and, thereafter, each macroblock is converted to blocks for the Y signal, the R-Y signal, and the B-Y signal, each block having a size of 8×8 pixels. As shown in FIG. 2, the blocks Y1, Cr1, and Cb1 for the Y, R-Y, and B-Y signals comprise 4 blocks (=2×2), 2 blocks (=2×1), and 2 blocks (=2×1), respectively, with 8×8 pixels as a unit. The macroblock MB is composed of these blocks Y1, Cr1, and Cb1.

Turning to FIG. 1, the digital video signal 20 so divided into the blocks is subjected to orthogonal transform for each block by the orthogonal transformer 12, resulting in orthogonal transform coefficients 121 (refer to FIG. 9). As a method for the orthogonal transform, for example, the discrete cosine transform (DCT) is used in the MPEG system. The orthogonal transform coefficients 121 are quantized by the quantizer 13 (refer to FIG. 9). In this first embodiment, the quantization is performed by dividing the orthogonal transform coefficients 121 with a value obtained by multiplying 8×8 quantization matrices corresponding to the respective frequencies of the orthogonal transform coefficients by a quantization scale 161 decided by the quantization scale decision circuit 16. The quantized orthogonal transform coefficients 131 are subjected to variable length coding by the variable length encoder 14, resulting in a code sequence 19. The generator code length counter 17 counts the length of the code sequence 141 that is output from the variable length encoder 14 for each macroblock within one frame, and an accumulated code length in the frame (in FIG. 11(a), $B_N$ for the macroblock number N) is obtained.

Figure 11:
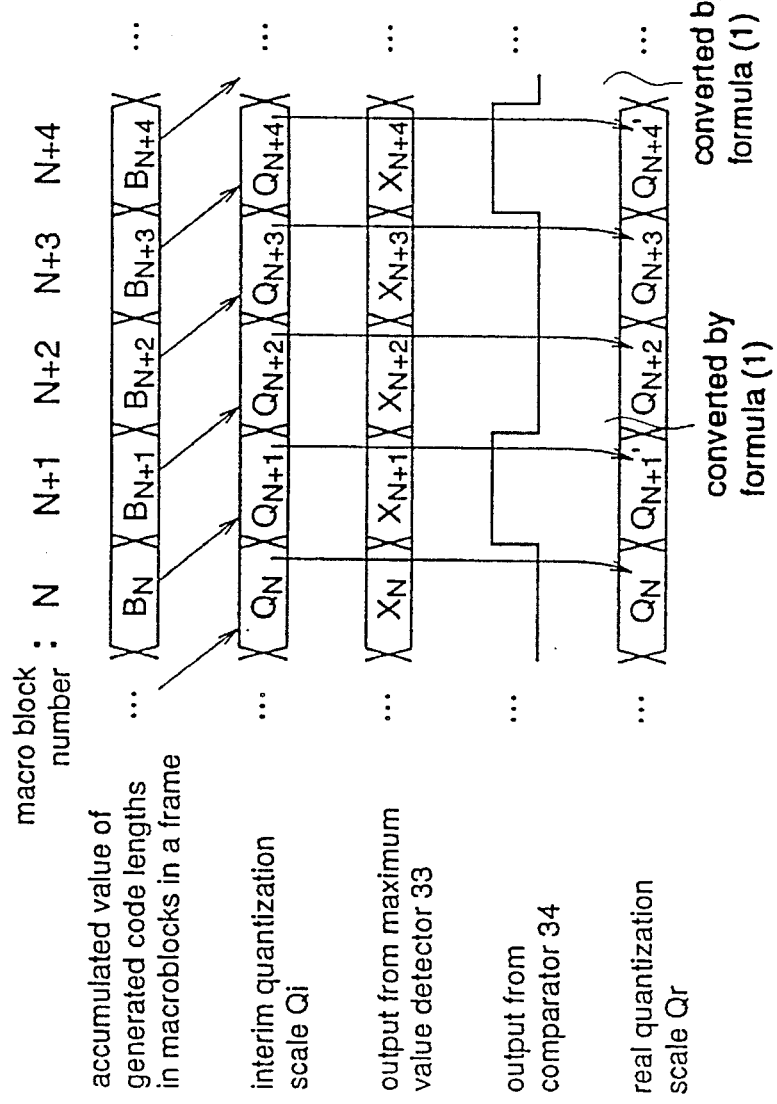
Figure 11:
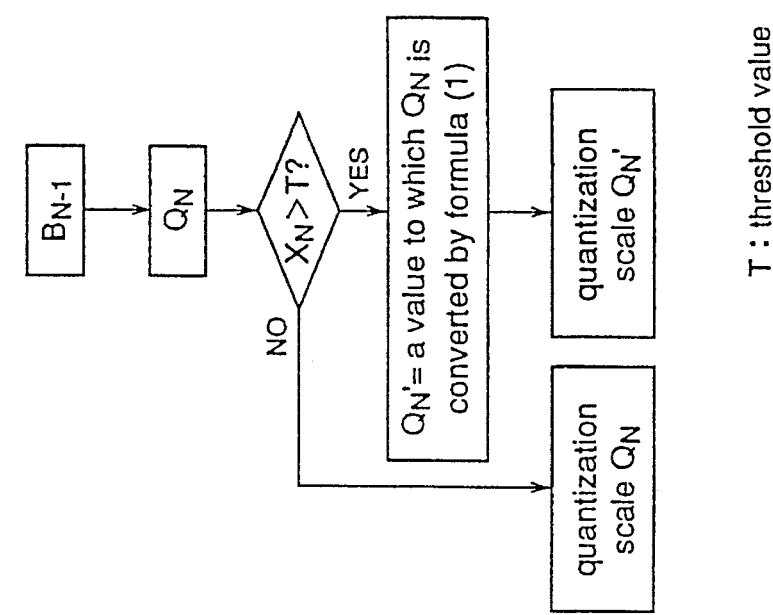

The quantization scale decision circuit 16 decides a quantization scale 161 (in FIG. 11(a), $Q_{N+1}$ or $Q_{N+1}'$ for $B_N$) on the basis of an output 22 from the chrominance signal inspection circuit 15 and an output 171 from the generator code length counter 17. The decision process will be described hereinafter.

Figure 3:
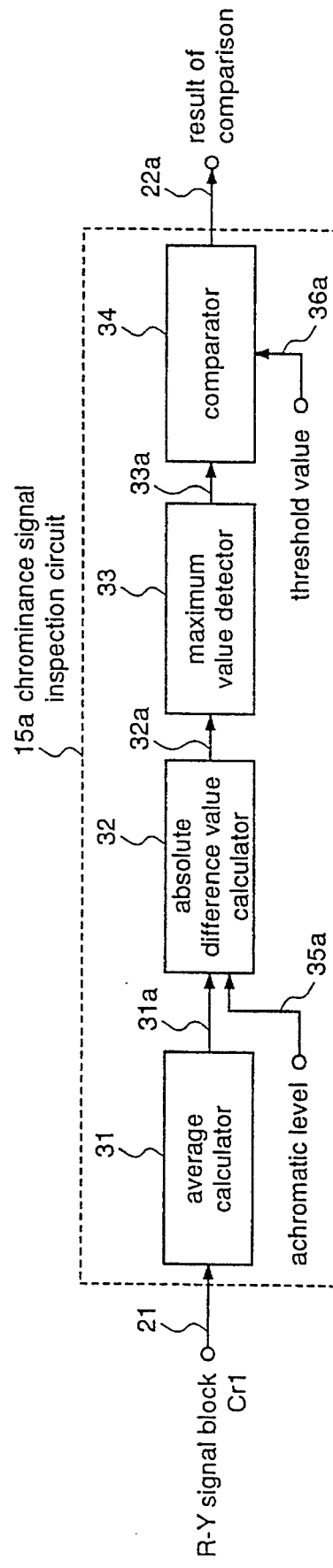
FIG. 3 is a block diagram illustrating a chrominance signal inspection circuit included in the color image encoder according to the first embodiment of the present invention.

FIG. 3 is a block diagram illustrating a chrominance signal inspection circuit 15a according to the first embodiment of the present invention. An R-Y signal 21, i.e., an R-Y signal block Cr1 shown in FIG. 2, which is output from the block converter 11 is input to the chrominance signal inspection circuit 15a. Initially, the R-Y signal 21 is input to an average calculator 31, wherein an average of the pixel values in each block of the R-Y signal 21, i.e., a DC (direct current) component, is obtained. An absolute difference value calculator 32 calculates the absolute value of a difference between the average value in each block obtained in the average calculator 31 and an achromatic level value of the chrominance signal. For example, in ITU-R REC.601 that is a standard for digital video signal, each pixel is represented with a precision of 8 bits, and the achromatic level of the chrominance signal is 128. Therefore, the R-Y signal takes a pixel value in a range from 16 to 240.

Figure 4:
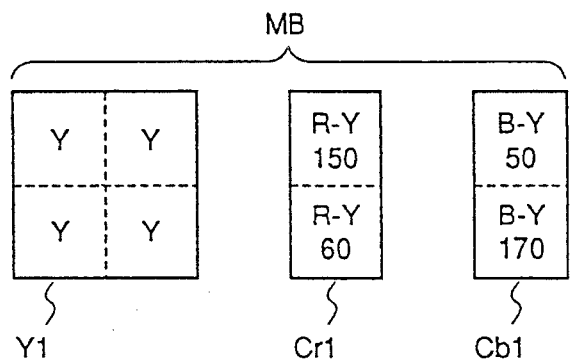
FIGS. 4(a) and 4(b) are schematic diagrams illustrating macroblocks MB in which average pixel values of chrominance signal blocks are shown.
FIGS. 4(c) and 4(d) illustrate absolute difference values, maximum values, real quantization scales, and interim quantization scales for the macroblocks shown in FIGS. 4(a) and 4(b), respectively.
Figure 4:
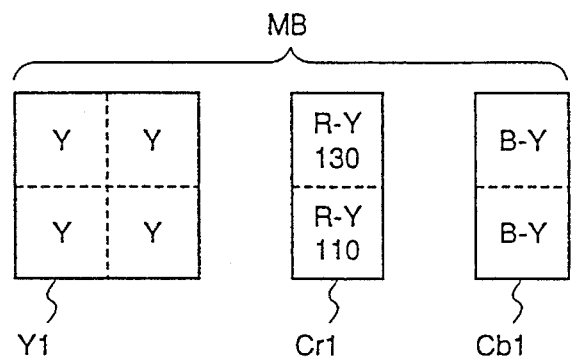
Figure 4:
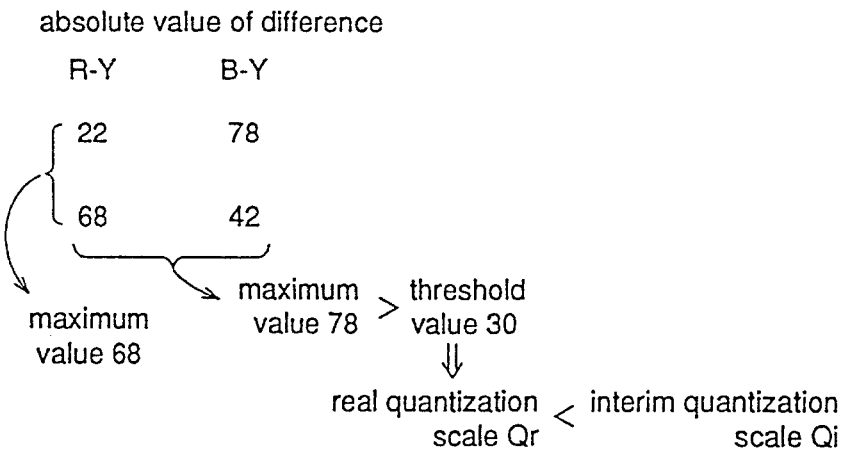
Figure 4:
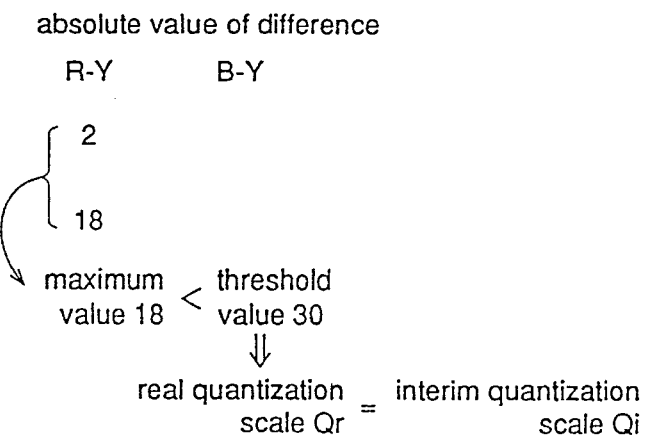

Therefore, when the average of the pixel value obtained by the average calculator 31 is 100, an output 32a from the absolute difference value calculator 32 is 28. The output 32a from the absolute difference value calculator 32 is input to a maximum value detector 33, wherein a maximum value is detected from the absolute values of the differences between the achromatic level and the average pixel values of the two R-Y signal blocks in the macroblock MB (in case of 4:2:2 format as shown in FIG. 2). For example, when the average pixel values of the two R-Y signal blocks are 150 and 60, respectively, as shown in FIG. 4(a), the absolute values of the differences from the achromatic level are 22 and 68, respectively, and the maximum value is 68. The maximum value 33a obtained by the maximum value detector 33 is input to a comparator 34, wherein the maximum value is compared with a threshold value 36a that is set in advance. The result of the comparison 22a, i.e., whether the maximum value is larger that the threshold value or not, is output from the comparator 34.

The quantization scale decision circuit 16 initially decides an interim quantization scale Qi (in FIG. 11(a), $Q_{N+1}$ for $B_N$) from the accumulated value 171 of the generated code lengths which have been obtained by the code length counter 17, that is, in case of MPEG, the accumulated value of all the generated code lengths within a frame (in FIG. 11(a), $B_N$ for the macroblock number N), so that the generated code length takes a prescribed value. Thereafter, the quantization scale decision circuit 16 changes the interim quantization scale Qi on the basis of the result of the judgment by the chrominance signal inspection circuit 15, i.e., the output 22a from the comparator 34, whereby a real quantization scale Qr is decided.

More specifically, when the comparator 34 judges that the maximum absolute value 33a is smaller than the threshold value 36a, the interim quantization scale Qi becomes a real quantization scale Qr. When the comparator 34 judges that the maximum absolute value 33a is larger than the threshold value 36a, a real quantization scale Qr is set at a value smaller than the interim quantization scale Qi (in FIG. 12(a), $Q_{N+1} \rightarrow Q_{N+1}'$, $Q_{N+4} \rightarrow Q_{N+4}'$). Now it is assumed that the threshold value 36a is 30 for the macroblocks MB shown in FIGS. 4(a) and 4(b). In the macroblock shown in FIG. 4(a), since the maximum absolute value 33a is 68 as shown in FIG. 4(c) and this is larger than the threshold value 36a, a real quantization scale Qr is set at a value smaller than the interim quantization scale Qi. On the other hand, in the macroblock shown in FIG. 4(b), since the maximum absolute value is 18, a real quantization scale Qr is equal to the interim quantization scale Qi (in FIG. 12(a), $Q_N \rightarrow Q_N$, $Q_{N+2} \rightarrow Q_{N+2}$, and $Q_{N+3} \rightarrow Q_{N+3}$).

A method of setting a real quantization scale Qr to a value smaller than the interim quantization scale Qi is considered for a case where the real quantization scale Qr is decreased with an increase in the maximum absolute value.

When the pixel value of each block of the R-Y signal is in a range from 16 to 240 and the achromatic level value of the chrominance signal is 128, the maximum value of the absolute value of a difference between them is 112. Therefore, when a real quantization scale Qr is set within a range from 1/3 to 1/2 of the interim quantization scale Qi, it is set as in the following formula (1).

$$Qr = Qi/\{2+(X-T)/(112-T)\} \quad (X>T) \tag{1}$$

wherein X is the maximum of the absolute value of the difference, and T is the threshold value.

The reason why the real quantization scale Qr is set at a value larger than 1/3 and smaller than 1/2 of the interim quantization scale Qi is as follows. If it is smaller than 1/3 of the interim quantization scale Qi, a larger amount of codes are assigned to the blocks having the absolute values of the difference larger than the threshold value while a less amount of codes are assigned to other macroblocks, whereby deteriorations of these macroblocks are increased. On the other hand, if the real quantization scale Qr is set at a value larger than 1/2 of the interim quantization scale Qi, deterioration in the image quality is not sufficiently suppressed.

The quantizer 13 performs a quantization using the real quantization scale Qr that is provided by the quantization scale decision circuit 16 and the quantization matrices that are decided in advance.

As described above, in the color image encoder according to the first embodiment of the invention, a relatively simple threshold calculation is performed for the R-Y signal. More specifically, an absolute value of a difference between an average of pixel values in each block of the R-Y signal and an achromatic level of the chrominance signal is obtained, and a maximum value of the absolute values within a macroblock which is a unit of a collection of pixels for which the quantization scale is to be changed is compared with a prescribed threshold value. When the maximum value is larger than the threshold value, the quantization scale is made smaller than the quantization scale which is obtained on the basis of the generated code length counted by the variable length encoder for the successively coded code sequence within a frame, i.e., a unit of a collection of blocks for which the generated code length counted by the variable length encoder is to be made constant.

[Embodiment 2]

A color image encoder according to a second embodiment of the present invention will be described hereinafter with reference to FIGS. 1 and 5. The color image encoder according to the second embodiment is different from the color image encoder according to the first embodiment in that a chrominance signal inspection circuit can inspect not only an R-Y signal block but also a B-Y signal block.

Figure 5:
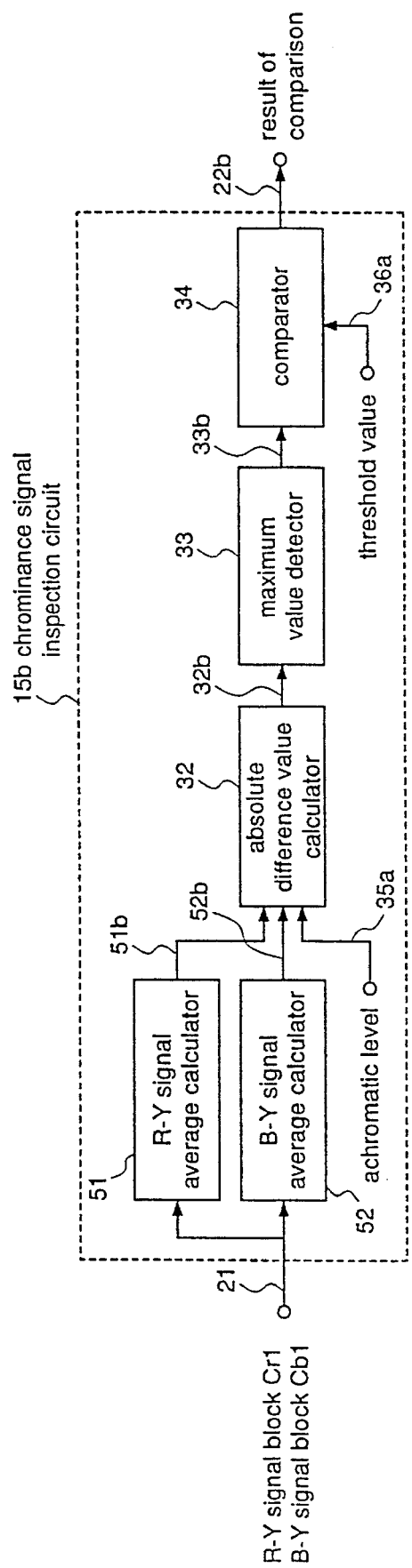
FIG. 5 is a block diagram illustrating a chrominance signal inspection circuit included in a color image encoder in accordance with a second embodiment of the present invention.

FIG. 5 is a block diagram illustrating a chrominance signal inspection circuit 15b according to the second embodiment of the invention. In FIG. 5, the same reference numerals as those shown in FIG. 3 designate the same or corresponding parts. Reference numeral 51 designates an R-Y signal average calculator, and reference numeral 52 designates a B-Y signal average calculator.

A description is given of the operation of the color image encoder. A digital image signal 18 is converted to blocks for the Y signal, the R-Y signal, and the B-Y signal by the block converter 11, and the R-Y signal block Cr1 and the B-Y signal block Cb1 are input to the chrominance signal inspection circuit 15b. That is, the R-Y signal block Cr1 and the B-Y signal block Cb1 are input to the R-Y signal average calculator 51 and the B-Y signal average calculator 52, respectively. The R-Y signal average calculator 51 and the B-Y signal average calculator 52 provide average values 51b and 52b of pixel values in each block of the R-Y signal and the B-Y signal, respectively, in the same manner as described for the average calculator 31 according to the first embodiment.

The average values 51b and 52b are input to the absolute difference value calculator 32, wherein an absolute value of a difference between each of the average values 51b and 52b and an achromatic level value 35a of the chrominance signal is obtained. After the absolute values 32b are obtained for all of the R-Y signal blocks and the B-Y signal blocks in a macroblock MB, and a maximum value 33b is detected from the absolute values of the 8×8 pixel blocks of all the chrominance signal blocks Cr1 and Cb1 in the macroblock MB by the maximum value detector 33. Thereafter, the detected maximum value 33b is compared with a threshold value 36a by the comparator 34, and a result 22b of the comparison is output from the comparator 34.

For example, in the macroblock MB shown in FIG. 4(a), the average pixel values of the 8×8 pixel blocks in the R-Y signal block Cr1 and the B-Y signal blocks Cb1 are 150, 60, 50, and 170. When an absolute value of a difference between each of these average pixel values and the achromatic level value (128) is calculated, 22, 68, 78, and 42 are obtained as shown in FIG. 4(c). Therefore, the maximum value 33b is 78, and this maximum value is compared with the threshold value 36a.

A method of deciding a real quantization scale by the quantization scale decision circuit 16 using the result of the comparison is identical to the method already described with respect to the first embodiment of the invention.

As described above, in the color image encoder according to the second embodiment of the present invention, a relatively simple threshold calculation is performed for the R-Y signal and the B-Y signal. More specifically, an absolute value of a difference between an average of pixel values in each block of the R-Y signal and the B-Y signal and an achromatic level of the chrominance signal is obtained, and a maximum value of the absolute values within a macroblock which is a unit of a collection of pixels for which the quantization scale is to be changed is compared with a prescribed threshold value. When the maximum value is larger than the threshold value, the quantization scale is made small for the macroblock. Therefore, visually conspicuous deterioration of image quality can be reduced.

[Embodiment 3]

Figure 6:
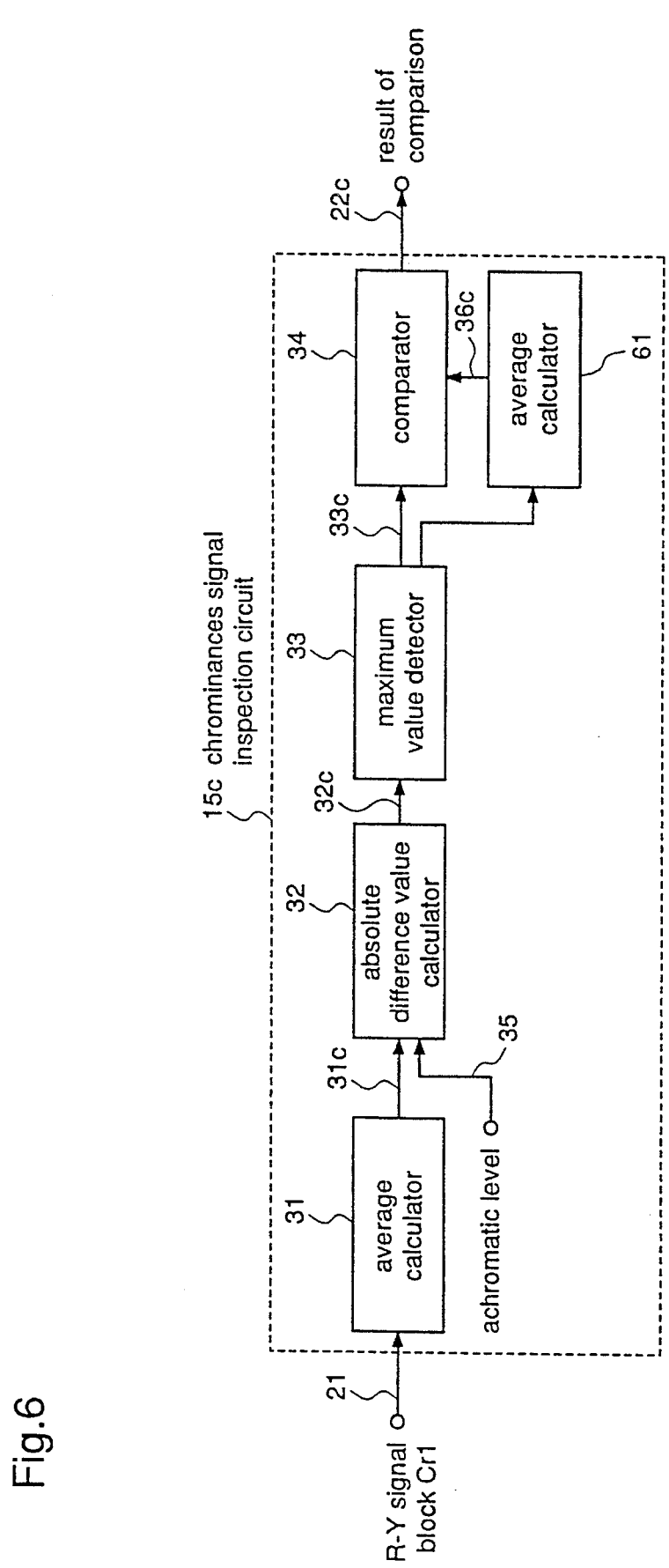
FIG. 6 is a block diagram illustrating a chrominance signal inspection circuit included in a color image encoder in accordance with a third embodiment of the present invention.

While in the first and second embodiments of the invention the threshold value 36a is a constant value that is set in advance, it may be variable. FIG. 6 shows a chrominance signal inspection circuit 15c according to a third embodiment of the present invention.

In FIG. 6, the same reference numerals as those shown in FIG. 3 designate the same or corresponding parts. Reference numeral 61 designates an average calculator receiving maximum values 33c from the maximum value detector 33 and calculating an average of the maximum values. An output 36c from the average calculator 61 is input to the comparator 34 as a threshold value.

In this third embodiment of the invention, the maximum value 33c detected from the absolute values in a macroblock for which the quantization scale is to be made small is input to the average calculator 61, and an average of the maximum values for one frame is obtained in the average calculator 61. The obtained average is used in the comparator 34 as a threshold value 36c for the next frame.

Therefore, when the chrominance signal inspection circuit 15c is employed, a threshold value used for judging if the chrominance signal exceeds the threshold value can be changed adaptively to the quality of the image of the previous frame. Therefore, a macroblock for which the quantization scale is to be made small can be selected adaptively to the quality of the image.

As described above, in the color image encoder according to the third embodiment of the invention, a relatively simple threshold operation is performed for the R-Y signal and the B-Y signal, and a threshold value for the threshold operation is variable. Therefore, a macroblock for which the quantization scale is to be made small can be selected adaptively to the quality of the image.

The above-described structure for making the threshold value used for judgment of the chrominance signal variable may be applied to the color image encoder according to the second embodiment of the invention.

[Embodiment 4]

Figure 7:
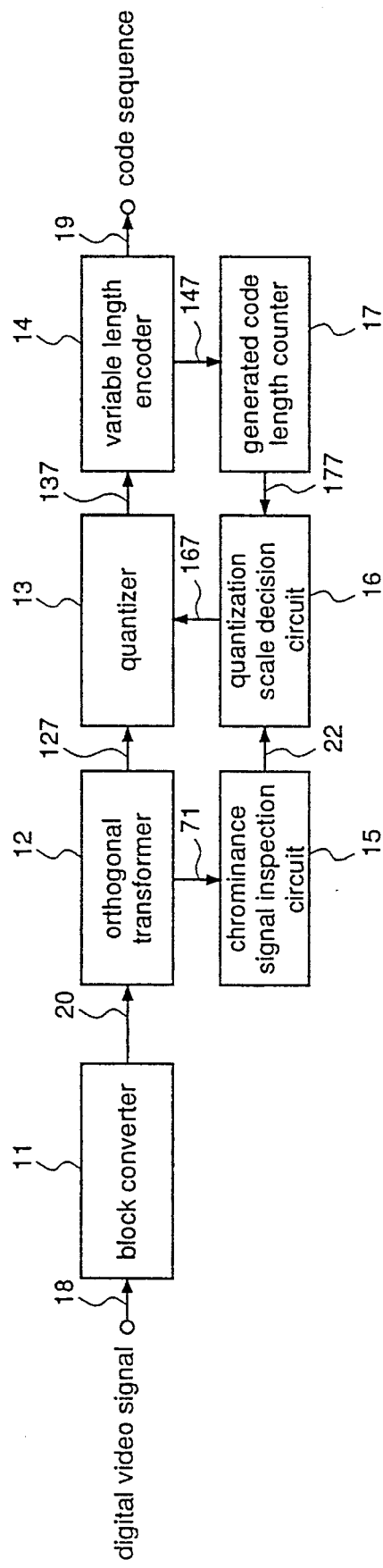
FIGS. 7(a) and 7(b) are block diagrams illustrating a color image encoder and a chrominance signal inspection circuit included in the color image encoder, respectively, in accordance with a fourth embodiment of the present invention.
Figure 7:
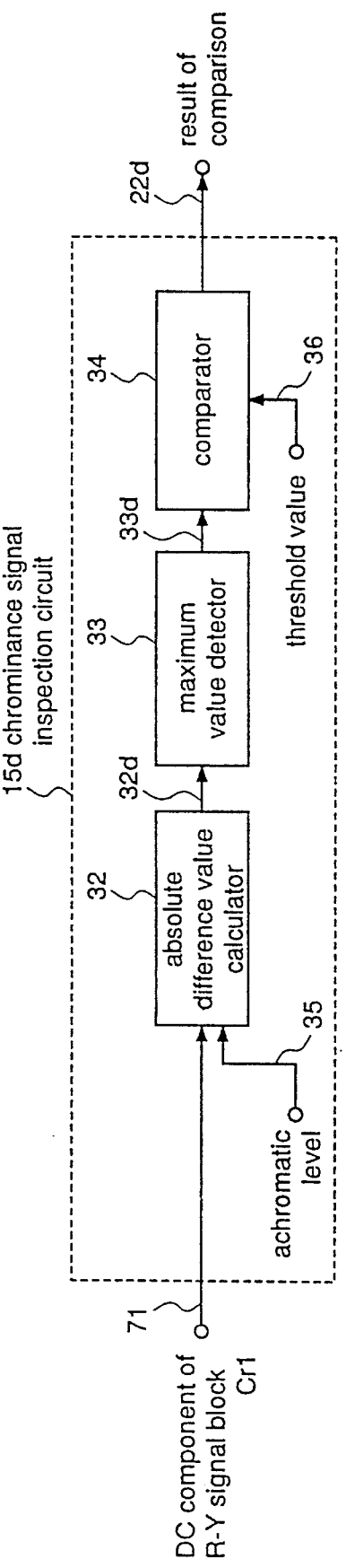
Figure 8:
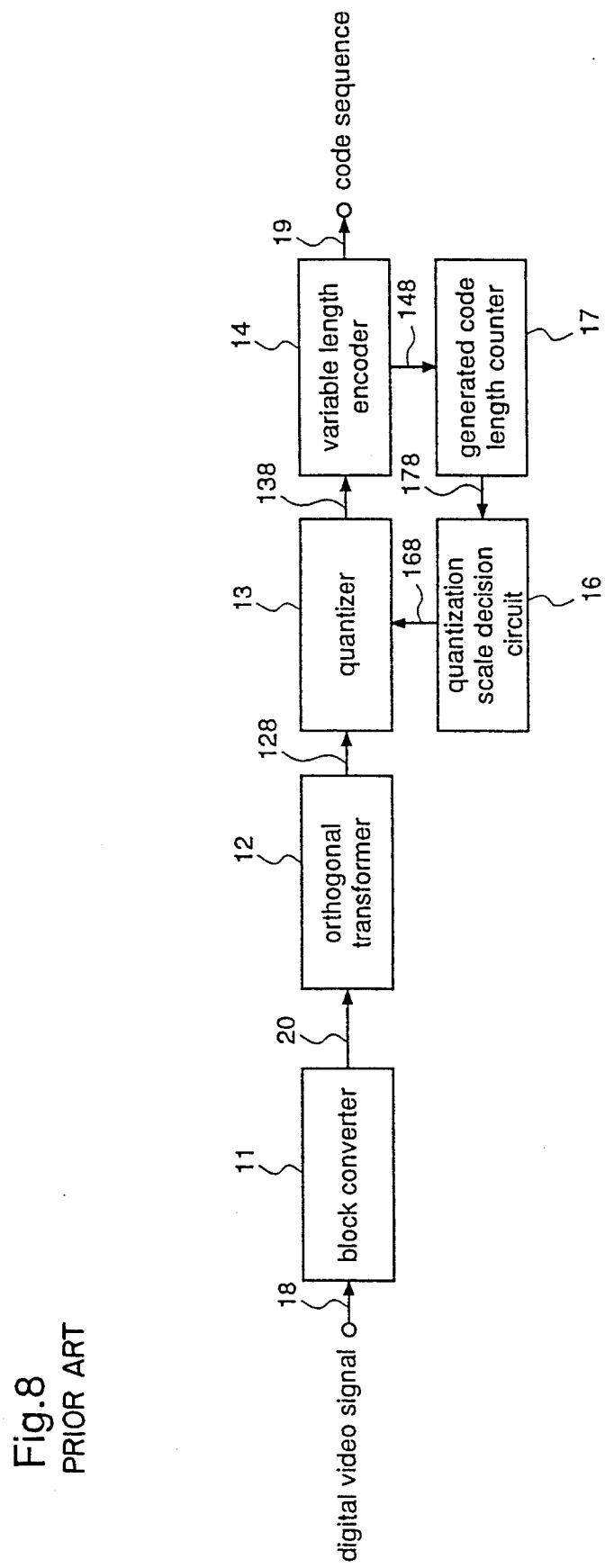
FIG. 8 is a block diagram illustrating a conventional color image encoder.

Although an average of pixel values in each chrominance signal block is obtained by the average calculator 31, the R-Y signal average calculator 51, and the B-Y signal average calculator 52 in the aforementioned embodiments of the invention, this average may be obtained from a DC component of the chrominance signal block obtained by the orthogonal transformer 12. In this case, the color image encoder shown in FIG. 1 and the chrominance signal inspection circuit shown in FIG. 3 are modified as shown in FIGS. 7(a) and 7(b), respectively. FIGS. 7(a) and 7(b) illustrate a color image encoder and a chrominance signal inspection circuit according to a fourth embodiment of the present invention, respectively. In these figures, a DC component 71 of the R-Y signal block Cr1 is output from the orthogonal transformer 12 and input to the chrominance signal inspection circuit 15a, whereby an operation similar to the operation according to the first and second embodiments is realized. This modification may be applied to the chrominance signal inspection circuits 15b and 15c shown in FIGS. 5 and 6, respectively.

Although the MPEG is described as an example of a color image coding system in the aforementioned embodiments of the invention, other coding systems may be employed as long as they have a structure as shown in FIG. 1.

Although the same quantization scale is used for the Y, R-Y, and B-Y signals in the aforementioned embodiments of the invention, an interim quantization scale may be used for the Y signal as in the conventional system whereas a real quantization scale is used for the R-Y and B-Y signals.

Figure 12:
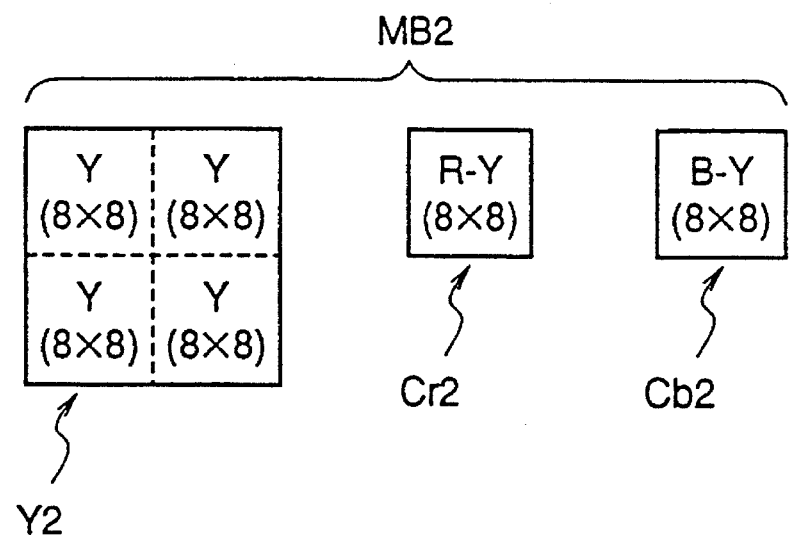
FIGS. 12(a) and 12(b) are schematic diagrams for explaining the relationship between luminance signal blocks and chrominance signal blocks when a digital video signal has a format of 4:2:0 and a format of 4:1:1, respectively.
Figure 12:
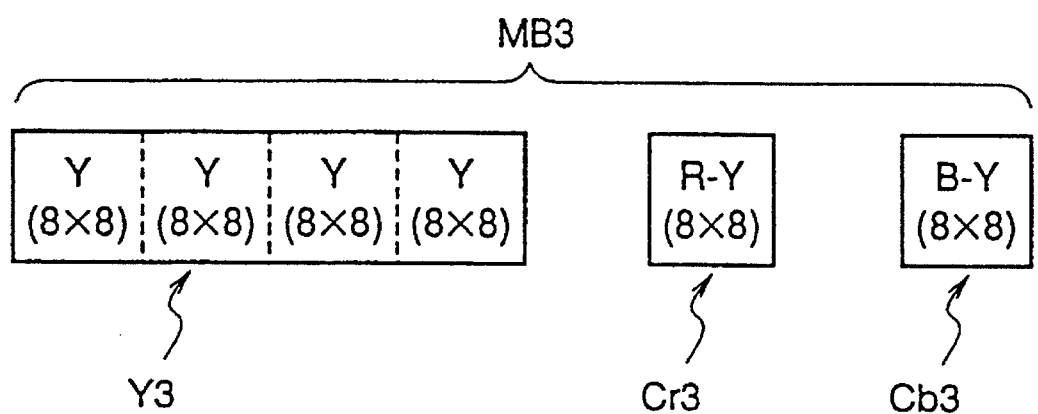

Although a digital video signal 18 which is input to the block converter 11 has a format of 4:2:2 in the aforementioned embodiments, the present invention can be applied to a case where the digital video signal 18 has a format of 4:2:0 or 4:1:1. When the digital video signal 18 has a format of 4:2:0, it is converted to blocks Y2, Cr2, and Cb2 as shown in FIG. 12(a). On the other hand, when the digital video signal 18 has a format of 4:1:1, it is converted to blocks Y3, Cr3, and Cb3 as shown in FIG. 12(b). In both cases, since the macroblocks MB2 and MB3 respectively include a single R-Y signal block Cr2 and a single R-Y signal block Cr3, the maximum value detector 33 is dispensed with.

Although each block has a size of 8×8 pixels in the aforementioned embodiments, the block size is not restricted thereto.

Although a real quantization scale is set to a value within a range from ½ to ⅓ of an interim quantization scale using formula (1) in the aforementioned embodiments, the range of the real quantization scale is not restricted thereto.

Although a real quantization scale is obtained from an interim quantization scale using formula (1) as a conversion formula in the aforementioned embodiments, other methods may be employed as long as the real quantization scale is made smaller than the interim quantization scale.

Although formula (1) is employed as a conversion formula for the quantization scale in the aforementioned embodiments, a conversion table recorded in a ROM or the like may be employed for the conversion of the quantization scale.

According to the third embodiment of the invention shown in FIG. 6, the average calculator 61 calculates an average of the maximum absolute values in one frame. However, the number of the frames is not restricted thereto. Further, an average of the maximum absolute values may be obtained in a unit of a collection of pixels other than a frame. For example, an average of the maximum value of the absolute value of the difference may be obtained over all macroblocks previous to the macroblock under coding in that frame.

What is claimed is:

1. A color image encoder for coding a digital color video signal comprising a Y signal as a luminance signal and R-Y and B-Y signals as chrominance signals, the color image encoder comprising:

a block converter for dividing the digital color video signal into blocks for the Y signal, the R-Y signal, and the B-Y signal;

an orthogonal transformer for orthogonally transforming the digital color video signal divided into the blocks, for each block, to produce orthogonal transform coefficients;

a quantizer for quantizing the orthogonal transform coefficients;

a variable length encoder for coding the quantized orthogonal transform coefficients to produce a code sequence;

a generator code length counter for accumulatively counting the length of the code sequence which is successively coded by the quantizer, in a collection of blocks for which the generated code length counted by the variable length encoder is to be made constant;

a chrominance signal inspection circuit for calculating an absolute value of a difference between an average of pixel values in each block of at least one of the two chrominance signals and a value in an achromatic level of the chrominance signal, detecting a maximum value from the absolute values in a unit of a collection of pixels for which a quantization scale used in the quantizer is to be changed, and comparing the maximum value with a prescribed threshold value; and a quantization scale decision circuit for providing a real quantization scale used in the quantizer on the basis of the length of the code sequence counted by the generator code length counter when the chrominance signal inspection circuit judges that the maximum value is smaller than the threshold value, and providing a real quantization scale used in the quantizer so that it becomes smaller than an interim quantization scale which is obtained on the basis of the length of the code sequence counted by the generator code length counter when the chrominance signal inspection circuit judges that the maximum value is larger than the threshold value.

2. The color image encoder of claim 1 wherein the threshold value used in the chrominance signal inspection circuit is a constant value.

3. The color image encoder of claim 1 wherein the threshold value used in the chrominance signal inspection circuit is a variable value.

4. The color image encoder of claim 3 wherein the threshold value used in the chrominance signal inspection circuit is an average of the maximum values of the absolute values obtained for the frame for which the coding has just been performed.

5. The color image encoder of claim 1 wherein the real quantization scale is set to ½~⅓ of the interim quantization scale.

6. The color image encoder of claim 1 wherein the real quantization scale is set against the interim quantization scale using the following formula:

$$Qr=Qi/\{2+(X-T)/(112-T)\} \ (X>T)$$

wherein Qr is the real quantization scale, Qi is the interim quantization scale, X is the maximum value of the absolute value of the difference, and T is the threshold value.

7. The color image encoder of claim 1 wherein a DC component of the chrominance signal block obtained by the orthogonal transformer is used as an average of pixel values of the chrominance signal block.

* * * * *